United States Patent [19]

Schaaphok

[11] 4,075,905
[45] Feb. 28, 1978

[54] STABILIZED FLEXIBLE REMOTE CONTROL WITH SPACED BALL BEARINGS

[75] Inventor: Peter R. W. Schaaphok, Mount Kisco, N.Y.

[73] Assignee: Controlex Corporation of America, Croton Falls, N.Y.

[21] Appl. No.: 745,592

[22] Filed: Nov. 29, 1976

[51] Int. Cl.² .......................... F16C 1/10; B21H 1/14
[52] U.S. Cl. .............................. 74/501 R; 74/501 P; 29/148.4 R
[58] Field of Search .................. 74/501 R, 501 P; 29/148.4 A, 148.4 B, 148.4 C, 148.4 R

[56] References Cited

U.S. PATENT DOCUMENTS

| | | | |
|---|---|---|---|
| 1,480,975 | 1/1924 | Wickland | 29/148.4 C |
| 1,543,320 | 6/1925 | Cofrancesco et al. | 29/148.4 C |
| 2,534,379 | 12/1950 | Schreiber | 29/148.4 A |
| 2,869,377 | 1/1959 | Pieterse | 74/501 R X |
| 3,509,782 | 5/1970 | Molnar | 74/501 R |
| 3,552,218 | 1/1971 | Gregory, Jr. | 74/501 R |
| 3,580,103 | 5/1971 | Shreve | 74/501 R |
| 3,631,731 | 1/1972 | Hawtree et al. | 29/148.4 A X |
| 3,719,979 | 3/1973 | Irwin | 29/148.4 C X |
| 3,841,171 | 10/1974 | Young, Jr. | 74/501 R |

Primary Examiner—Benjamin W. Wyche
Assistant Examiner—Don E. Ferrell
Attorney, Agent, or Firm—Paul W. Garbo

[57] ABSTRACT

Flexible remote controls of the type in which at least one push-pull blade extends through a tubular sheath and is supported on its opposite sides by a linear series of spaced balls are improved by placing two linear series of spaced balls in contact with each of the opposite sides of each push-pull blade in the remote control.

7 Claims, 3 Drawing Figures

STABILIZED FLEXIBLE REMOTE CONTROL WITH SPACED BALL BEARINGS

BACKGROUND OF THE INVENTION

This invention relates to a tubular flexible remote control in which one or more push-pull blades are slidable lengthwise in the tubular sheath on spaced rolling elements disposed on opposite sides of each blade.

Illustrative of such a flexible remote control is that disclosed in U.S. Pat. No. 2,841,029 to Richoux in which the balls are spaced from one another by cage strips having openings to hold the individual balls. Metal ball-cage strips of the type disclosed by Richoux are relatively expensive to make, are comparatively heavy and suffer from the fact that their metal necessarily rubs with other metal elements of the control. U.S. Pat. No. 3,667,313 was granted to Young for the improvement of ball-cage strips made of flexible plastic. However, flexible remote controls have heretofore depended on a single line or series of spaced ball bearings in contact with each side of a push-pull blade to provide facile movement of the blade. The stack formed by two lines of balls and a push-pull blade between the two lines of balls is inherently an unstable arrangement which tends to become operatively less reliable as the load on the push-pull blade is increased. This tendency is augmented when the remote control has more than one push-pull blade as disclosed in U.S. Pat. No. 3,552,218 to Gregory.

Accordingly, the object of this invention is to provide an improved arrangement of ball bearings and push-pull blades in tubular flexible remote controls that overcomes the undesirable instability of the arrangement used heretofore.

SUMMARY OF THE INVENTION

In accordance with this invention, at least one side of the push-pull blade is provided with two parallel grooves in which two series or lines of ball bearings are disposed to roll when the blade is pulled or pushed.

For a fuller understanding of the invention, reference is now made to the accompanying drawings.

DESCRIPTION OF PREFERRED EMBODIMENT

Figure 1:
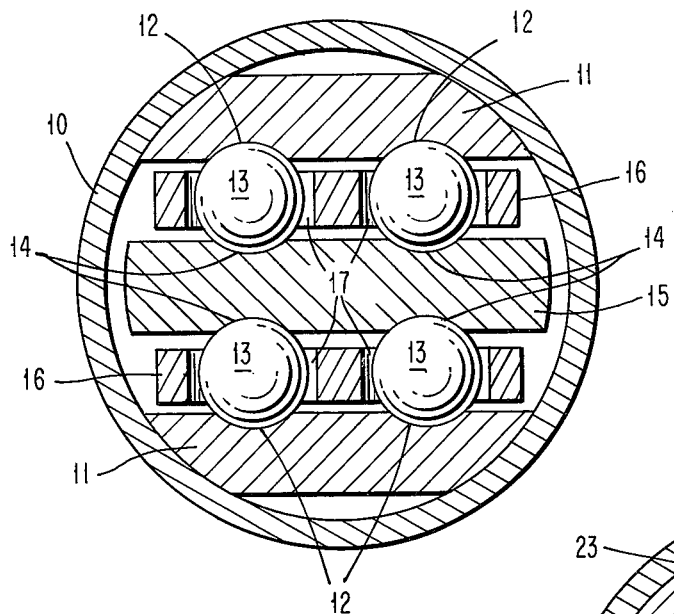
FIG. 1 is a cross-sectional view of a tubular flexible remote control showing the push-pull blade formed and supported with ball bearings in accordance with one embodiment of the invention.

FIG. 1 shows in cross-section a tubular flexible remote control comprising flexible sheath 10 in which are disposed two outer races 11, each having two parallel grooves 12 contacted by two series or lines of spaced ball bearings 13 which in turn contact two parallel grooves 14 on the opposite sides of push-pull blade 15. As known in the art of remote ball bearing controls, balls 13 on each side of push-pull blade 15 are maintained with the desired spacing between successive balls 13 by ball-cage strips 16 which preferably are made of flexible plastic as taught by U.S. Pat. No. 3,667,313. Strips 16 have holes 17 in which balls 13 are loosely retained.

Figure 2:
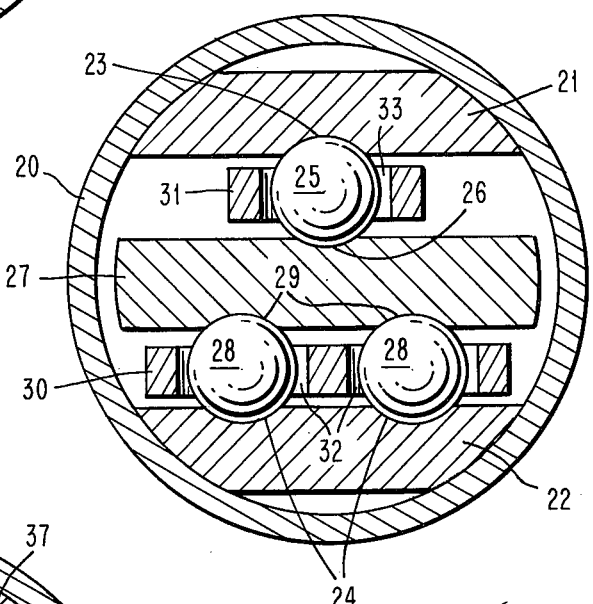
FIG. 2 is a cross-sectional view of a similar control showing the push-pull blade formed and supported according to another embodiment of the invention.

FIG. 2 is the cross-section of another remote control in which the stack of ball bearings and push-pull blade has been stabilized by a different embodiment of the invention. This control has tubular sheath 20 holding two outer races 21 and 22. Race 21 has the conventional single groove 23 while race 22 has two parallel grooves 24 pursuant to this invention. A series of spaced balls 25 contacts groove 23 of race 21 as well as center groove 26 of push-pull blade 27. Two series of spaced balls 28 ride in parallel grooves 24 of race 22 and in parallel grooves 29 of blade 27. The two series of balls 28 are kept with the desired spacing between successive balls by ball-cage strip 30 which has holes 32. Similarly, balls 25 are held in spaced relation to one another by ball-cage strip 31 which has holes 33 slightly larger than balls 25.

Comparing the remote controls of FIGS. 1 and 2, it may be noted that the stack of the push-pull blade and the balls on the opposite sides of the blade has essentially the same stability in both arrangements but the control of FIG. 2 requires 25% less balls and one narrower ball-cage 31. Accordingly, the control of FIG. 2 is lighter in weight and less expensive than the control of FIG. 1.

Figure 3:
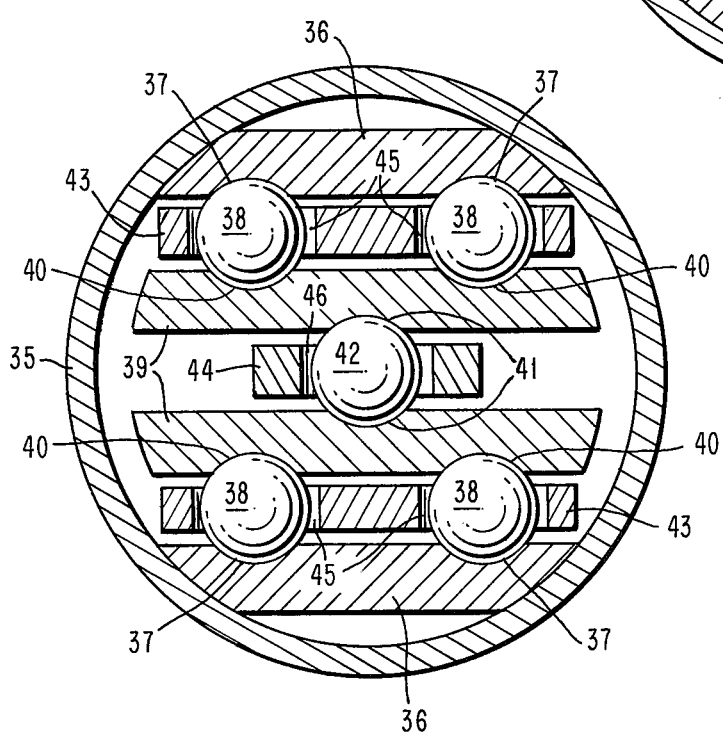
FIG. 3 is a cross-sectional view of a remote control with two push-pull blades of this invention.

FIG. 3 shows the cross-section of a tubular remote control having two push-pull blades. Flexible tube 35 holds two outer races 36 each having two parallel grooves 37 in which are disposed two series of spaced balls 38. Two push-pull blades 39 have on one side thereof two parallel grooves 40 to receive the two series of spaced balls 38 riding in parallel grooves 37 of one of the two races 36. The other side of each push-pull blade 39 has a center groove 41 and a series of spaced balls 42 rides in grooves 41 of both blades 39. Ball-cage 43 with holes 45 holds balls 38 in spaced relation along the length of each of the two races 36 while a narrower ball-cage 44 with holes 46 loosely holds balls 42 with the desired spacing between successive balls.

Those skilled in the art will visualize variations of the invention set forth hereinbefore without departing from its spirit and scope. For instance, the two blades 39 of FIG. 3 may each have two parallel grooves 41 and then two parallel series of spaced balls 42 will be disposed between blades 39. Also, balls 25 of FIG. 2 and balls 42 of FIG. 3 may be larger than balls 28 and balls 38, respectively, to provide in a single series of balls a contact area equal to the contact area of two parallel series of smaller balls. Accordingly, only such limitations should be imposed on the invention as are set forth in the appended claims.

What is claimed is:

1. In a tubular flexible remote control for transmitting push and pull forces wherein at least one flexible push-pull blade is in contact with a series of spaced balls on each of its opposite sides, the improvement of said control wherein each said blade has two parallel grooves in at least one side of each said blade and two parallel series of spaced balls are disposed in said two parallel grooves of each said blade.

2. The remote control of claim 1 wherein each of the opposite sides of each push-pull blade has two parallel grooves and two parallel series of spaced balls disposed in said two parallel grooves.

3. The remote control of claim 1 wherein there are two push-pull blades, each of said blades has two parallel grooves in one side thereof and a single groove in the opposite side thereof, and said two blades are disposed with their single grooves facing one another and in contact with a single series of spaced balls.

4. The remote control of claim 3 wherein the balls of the single series and the single grooves are larger than the balls of the two parallel series and the two parallel grooves, respectively.

5. The remote control of claim 1 wherein there is a single push-pull blade, each side of said blade has two parallel grooves, and two parallel series of spaced balls are disposed in said two parallel grooves of each said side.

6. The remote control of claim 1 wherein there is a single push-pull blade, one side of said blade has two parallel grooves, two parallel series of spaced balls are disposed in said two parallel grooves, the other side of said blade has a single groove, and a single series of spaced balls is disposed in said single groove.

7. The remote control of claim 6 wherein the balls of the single series and the single groove are larger than the balls of the two parallel series and the two parallel grooves, respectively.

* * * * *